L. S. HUGHES.
FURNACE.
APPLICATION FILED MAR. 20, 1906. RENEWED NOV. 27, 1908.
920,333. Patented May 4, 1909.
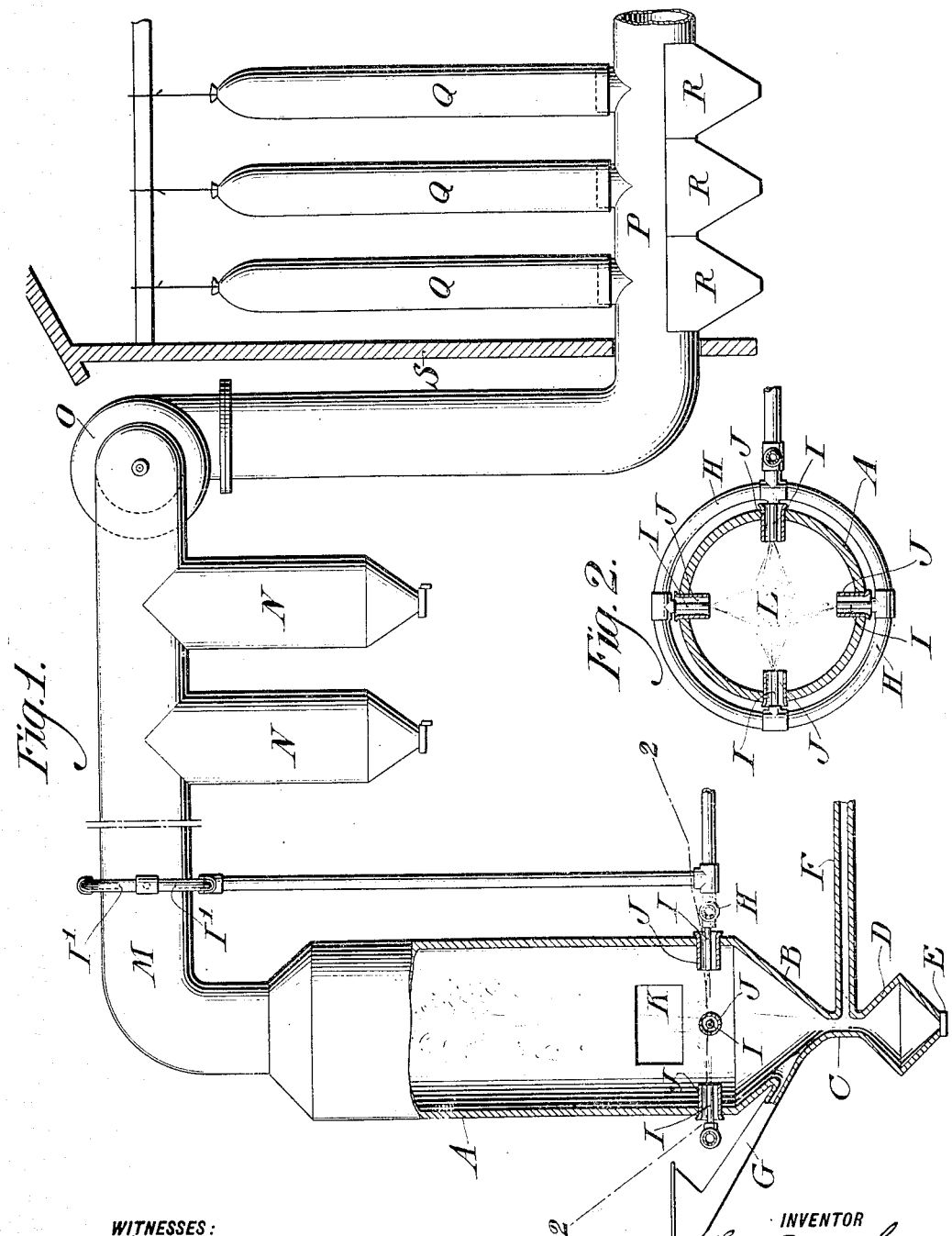

UNITED STATES PATENT OFFICE.

LOUIS S. HUGHES, OF JOPLIN, MISSOURI, ASSIGNOR TO PICHER LEAD COMPANY, OF JOPLIN, MISSOURI, A CORPORATION OF MISSOURI.

FURNACE.

No. 920,333.　　　Specification of Letters Patent.　　　Patented May 4, 1909.

Application filed March 20, 1906, Serial No. 306,954. Renewed November 27, 1908. Serial No. 464,781.

*To all whom it may concern:*

Be it known that I, LOUIS S. HUGHES, a citizen of the United States of America, residing in Joplin, in the county of Jasper and State of Missouri, have invented a certain new and useful Improvement in Furnaces, of which the following is a true and exact description, reference being had to the accompanying drawings, which form a part thereof.

My invention relates to furnace construction and has for its object to provide a furnace of novel construction and one adapted for the commercial exploitation of novel methods of treating ores, notably of a process in which galena, finely divided and in intimate mixture with air, is ignited and caused to produce from its lead and sulfur lead sulfate in a condition for use as pigment without fusion of the ore and with little or no decomposition of such iron sulfid as may be present, this process forming the subject matter of my copending application for Letters Patent filed February 14th, 1906, Serial Number 300,966.

The novel features of my furnace will be best understood as described in connection with the drawing in a simple and efficacious commercial form and in which—

Figure 1 is an elevation of a furnace, partly in central vertical section showing in connection with the furnace the flues and screen system which are conveniently provided for the recovery of the lead sulfate or sublimed white lead as it is commercially known. Fig. 2 is a cross-section on the line 2—2 of Fig. 1.

A, indicates the furnace body which, for the best results, should be vertical as shown and which is characterized in that it is unlined with refractory material and so constructed that it will rapidly abstract heat from a burning mass within the furnace chamber. I have found it unnecessary to use water jackets or cooling flues in connection with the furnace and that the abstraction of the heat therefrom is sufficiently energetic if the furnace body is constructed with sheet metal or boiler plate.

B is a conical bottom to the furnace chamber terminating in a vertical conduit section C, below which, by preference, I form a collecting chamber D, having a removable bottom closing plate, as indicated at E.

F, is an air blast pipe, as shown entering the conduit C, which conduit forms a vertical extension or nozzle for the blast pipe.

G, is an ore feeding chute through which finely divided ore is fed to the furnace.

H, is an annular gas supply pipe connected with any source of gas supply and connecting with the interior of the furnace with a series of gas burner pipes I, I, etc., which project through the walls of the furnace A, and, preferably, to some distance within the same. These gas burner pipes are surrounded by air supply pipes or tubes as indicated at J, J; these tubes also extending to some distance within the walls of the furnace and the series of burners being preferably situated in a horizontal plane and so as to form an interior zone of non-reducing flame, as indicated at L; the construction also being such that this zone does not come in contact with the walls of the furnace or directly heat the same.

K, is a door leading into the furnace. M, a flue leading from the top of the furnace and having connected with its bottom hoppers, as indicated at N, N, in which subsided impurities are collected. The flue M, has situated in it a suction fan, indicated at O, and terminates in the horizontal section B, with the top of which are connected the fabric bags, indicated at Q, Q, etc., and to the bottoms of which are connected the pigment receiving hoppers R, R, etc., S, indicating the house surrounding the screen system. I have sometimes found it necessary or advisable to supply additional heating zones in the flue M, for the purpose of burning out any combustible impurities which may escape from the furnace. Any igniting zone may be employed but I have indicated at I', I' a practical duplication of the heating zone burners shown in connection with the furnace itself.

In operation, the bottom plate E, is closed, air and gas supplied through the burner tubes I, and J, and ignited in the center of the furnace, air turned on through the pipe F, and projected upward vertically in the furnace through the heating zone and pulverized ore fed to the furnace through the chute G, the ore being carried up into the heating zone by the air blast, ignited therein and burning in the upper part of the furnace body. The heat due to the ignition and combustion of the ore being largely carried away through the conducting walls of the furnace so that it is not permitted to attain such heat as would result in the fusion of the ore or the ignition of such impurities as iron sulfid. Unburned particles of ore are constantly kept in motion by the air blast, the heavy particles not escaping from the furnace but being from time to time permitted to settle into the chamber D, this occurring whenever the air blast is shut off. The sublimed lead sulfate is carried through the flue and screen system described and finally collected in the hoppers R, heavy impurities settling in the flue and being collected in the hoppers M.

Having now described my invention, what I claim as new and desire to secure by Letters Patent is—

1. A furnace for oxidizing ores at low temperatures consisting of a furnace chamber having means for forcing air into one end of the furnace, one or more igniting burners situated near the same end, means for feeding pulverized ore to the action of the air blast, the furnace beyond the ignition burner being constructed to abstract heat and thereby lower the temperature of the burning ore mixture.

2. A furnace having in combination an upright body portion constructed to abstract heat from and lower the temperature of the ignited charge in the furnace, a series of air fed gas burners projecting laterally through the walls of the body portion above but near its base, an air blast conduit directed axially upward from the bottom of the furnace and means for feeding finely divided ore to the furnace.

3. A furnace for oxidizing ores at low temperatures consisting of an upright furnace chamber of unlined sheet metal directly exposed to heat abstracting conditions, said chamber having a hopper shaped bottom, in combination with an ignition burner entering the furnace above but near the bottom thereof, an air blast conduit directed axially upward from the bottom of the furnace and means for feeding pulverized fuel to the furnace.

4. A furnace for oxidizing ores at low temperatures consisting of an upright furnace chamber of unlined sheet metal directly exposed to heat abstracting conditions, said chamber having a hopper shaped bottom, in combination with a series of symmetrically disposed ignition burners entering the furnace above but near the bottom thereof in a horizontal plane, an air blast conduit directed axially upward from the bottom of the furnace and means for feeding pulverized fuel to the furnace.

5. A furnace for oxidizing ores at low temperatures consisting of an upright furnace chamber of unlined sheet metal directly exposed to heat abstracting conditions, said chamber having a hopper shaped bottom, in combination with an ignition burner entering the furnace above but near the bottom thereof, an air blast conduit directed axially upward from the bottom of the furnace, means for feeding pulverized fuel to the furnace, a conduit leading from the top of the furnace and a screen system connected to the conduit.

6. An upright furnace of unlined sheet metal having a hopper shaped bottom, a chamber situated below and connected to the hopper bottoms, means for directing an axial air blast through the furnace, and gas burners entering the furnace near its bottom.

LOUIS S. HUGHES.

Witnesses:
 JERE. CHARLOW,
 BELLE SPARKS.